United States Patent [19]

De Bazelaire et al.

[11] Patent Number: 5,663,928
[45] Date of Patent: Sep. 2, 1997

[54] METHOD FOR ANALYSING AND PROCESSING SEISMIC REFLECTION DATA FOR THE DETERMINATION OF A HIGH RESOLUTION SPATIAL VELOCITY FIELD FOR HYPERBOLICITY CORRECTION

[75] Inventors: Eric De Bazelaire, Lescar; Jean-Pierre Dunand, Soumoulou, both of France

[73] Assignee: Elf Aquitaine Production, France

[21] Appl. No.: 663,132

[22] PCT Filed: Oct. 13, 1995

[86] PCT No.: PCT/FR95/01345

§ 371 Date: Jun. 18, 1996

§ 102(e) Date: Jun. 18, 1996

[87] PCT Pub. No.: WO94/12484

PCT Pub. Date: Oct. 19, 1994

[30] Foreign Application Priority Data

Oct. 19, 1994 [FR] France ................... 94 12 484

[51] Int. Cl.⁶ ............................................ G01V 1/36
[52] U.S. Cl. .................................. 367/52; 367/51
[58] Field of Search ......................... 367/50, 51, 52, 367/38

[56] References Cited

U.S. PATENT DOCUMENTS 5,157,638 10/1992 Loumos et al. ...................... 367/54

FOREIGN PATENT DOCUMENTS 2251689 7/1992 United Kingdom .

OTHER PUBLICATIONS

Geophysics, vol. 53, No. 2, Feb. 1988, pp. 143–157, De Bazelaire 'Normal moveout revisited: inhomogenous media and curved interfaces'.

*Primary Examiner*—Ian J. Lobo
*Attorney, Agent, or Firm*—Ostrolenk, Faber, Gerb & Soffen, LLP

[57] ABSTRACT

A method of analysing and processing seismic reflection data for the determination of a high resolution spatial hyperbolicity correction velocity field.

The method is characterised in that:

for the set of normal moveout-corrected gathers, the maximum values of the positive and negative residues of the NMO correction are determined: a time range analysis is determined located on either side of a time $t_0$ and of which the width is equal to not more than twice the absolute value of the maximum residual moveout, a family of 2n+1 residual correction hyperbolas or parabolas are constructed, each having its apex centered on said time $t_0$ and, at the value of the maximum offset, presenting a value of time that is equal to one of the 2n+1 equidistant time values predetermined on the analysis range, and including the value $t_0$ and the extreme values of said analysis range,

2n+1 sets of static corrections are determined for each of the offsets, defined by the time differences presented relative to said time $t_0$ on the 2n+1 residual moveout correction hyperbolas or parabolas, for each gather, and successively to each of the traces and for each hyperbola or parabola, the static correction associated with the offset trace is applied, and the statically corrected traces are stacked together in order to obtain a set of 2n+1 stacked traces characterising correction velocity field.

8 Claims, 10 Drawing Sheets

FIG_1

FIG_2

FIG_3

FIG_4

FIG_7

FIG_8

FIG_9

FIG_10

FIG. 11

METHOD FOR ANALYSING AND PROCESSING SEISMIC REFLECTION DATA FOR THE DETERMINATION OF A HIGH RESOLUTION SPATIAL VELOCITY FIELD FOR HYPERBOLICITY CORRECTION

BACKGROUND OF THE INVENTION

In petroleum exploration, a seismic reflection survey is a common method for obtaining a seismic image of the subsurface. In this method, using appropriate energy sources, called emitters, acoustic waves are transmitted, travel in the subsurface to be explored, and are reflected on the different reflectors which it contains. The reflected waves are recorded, as a function of time, on adapted receivers disposed on the ground surface or in the water. Each recording (or trace) given by a receiver is then assigned to the location of the point which is situated at the middle of the segment connecting the source to the receiver. This operation is referred to as common midpoint gather.

A seismic prospecting technique, which is now conventional, is multiple coverage. In this technique, the sources or emitters and receivers are disposed on the ground surface in such a way that a given midpoint gathers several recordings. The series of recordings associated with the same midpoint forms what is generally called a common midpoint gather of recordings or traces. The set of gathers is associated with a series of different midpoints preferably located along the same line at the surface. Based on these gathers, seismic processing serves to obtain a seismic image in the vertical plane passing through all these midpoints. The arrival time of a recorded wave varies with the angle of incidence θ, which is the angle between the normal to the reflector at the reflection point, called the mirror point, and the direction of the incident (descending) wave. For a given gather and a given mirror point, this angle varies for each recording as a function of the offset x of the receiver relatively to the midpoint. Making the conventional assumption of a homogeneous and isotropic subsurface, in plane and parallel layers, the reflections associated with each of the subsurface reflectors, observed on a common midpoint gather, are theoretically aligned along hyperbolas centered on the vertical to the midpoint and called time/distance curves. In order to build the stack of the recordings of each gather, it is necessary to apply a correction depending on time, called the normal-moveout correction, which is aimed to straighten the hyperbolas to bring them theoretically to the horizontal. Conventionally, the normal-moveout correction made is a correction based on the following equation:

$$t^2 = t_0^2 \frac{x^2}{V^2} \qquad (1)$$

where:

x is the offset, $t_0$ is the zero-offset source/receiver reflection travel time, V, which is a function of time, is the average wave propagation velocity in the subsurface, and t is the travel time after reflection associated with a source/receiver pair for offset x.

To make satisfactory NMO corrections, it is necessary to know the velocity distribution V(t) at each midpoint. To achieve this, velocity analyses are made at given locations on a limited number of common midpoint gathers. The results are then subjected to a double interpolation, in time for each of the analyses, each analysis only giving a maximum of some twenty velocity values associated with the same vertical, and in abscissa, between the analyses, said analyses being commonly performed only every 40 to 50 midpoints on the average, and an account of the fact that the analysis is made manually, thus implying relatively long analysis times and relatively high processing costs.

The conventional velocity analysis consists in applying constant velocities in succession to the common midpoint gathers, for the midpoints selected, to make the corresponding NMO corrections, and then in stacking the corrected traces for each of the velocities used and in manually retaining the velocities that lead to an energy peak of the stacked trace. The accuracy of the velocity field obtained by this process is insufficient for a large number of more sophisticated treatments applied to the prestack traces (recordings), for example migration, inversion, measurements of effects of variations in amplitude with offset (denoted by AVO for Amplitude Variation versus Offset), because these processes are distorted by the effects of the time and abscissa interpolations, by the inaccuracy of the velocity values selected, and by a signal distortion due to the NMO correction formula (1).

In an article entitled 'Normal moveout revisited: Inhomogeneous media and curved interfaces', published in the review Geophysics, Volume53, No.2, February 1988, pp.143–157, Eric de Bazelaire has developed another method of velocity analysis, used for building improved stacked sections, called 'Polystack' sections. This analysis consists in constructing a document called BAP, which is associated with a common midpoint gather of recorded seismic traces.

The BAP associated with a common midpoint gather is another gather of traces, each of which is the result of the stacking of the traces of the common midpoint gather after the application to each of these traces of a static type of correction (independent of time) and different from one trace to another. These static corrections, which have the effect of shifting all the samples of a trace by the same time interval, are representative of predetermined curvatures. Said static corrections are defined by correction hyperbolas according to the following formula:

$$(t + t_p - t_0)^2 = t_p^2 + \frac{x^2}{V_1^2} \qquad (2)$$

where:

x is the offset, $V_1$ is the wave propagation velocity in the first subsurface layer explored, t and $t_0$ are the source/receiver reflection travel times for x offset and for zero offset respectively, $t_p$, called the time of focusing depth, is the sum of the time $t_0$ (time between the origin of the coordinates of the apex of the correction hyperbola) and the time between the origin of the coordinates and the centre of the hyperbola, of which the asymptote is controlled by a unique velocity. In the aforementioned formula, the term in $x^2$ could be followed by at least one higher order term in $x^4$ which is ignored.

Accordingly, the N traces of a BAP correspond to an investigation along N different moveouts or curvatures.

The BAP associated with a given common midpoint gather explores the whole field of possible hyperbolic curvatures for said midpoint, from the most concave at the bottom (low velocities) corresponding to low positive $t_p$, to the most convex towards the top (imaginary velocities), corresponding to negative $t_p$, and including the infinite velocity ($t_p$=+e,sez Y+ee). Since the area scanned is very wide, each of the BAP has a large number of columns, generally more than 200.

Although it serves to obtain an accurate and continuous velocity field, the Polystack method nevertheless has a number of disadvantages. First, it is a costly method, because computer time is long due to the size of the BAP (more than 200 columns). Secondly, risks of instability exist due to automatic picking errors on the BAP. Thirdly, this method does not at all eliminate the undifferentiated multiples of the real events.

SUMMARY OF THE INVENTION

The present invention proposes a semi-automatic method for analysing and processing seismic reflection data, which helps to remedy the shortcomings of the previous methods mentioned, while preserving their advantages. In particular, the method of the invention helps to obtain a high resolution spatial velocity field, with better resolution, as well as an improved stack section.

An aim of the present invention is a method of processing variable-offset seismic reflection recordings or traces, in order to obtain a high resolution spatial velocity field and/or composite seismic traces. Using common midpoint gathers, this method requires subjecting the traces of each of the gathers to a normal moveout correction, and it is characterised in that:

for the set of normal moveout-corrected gathers of traces, the maximum values of the positive and negative residues of the NMO correction are determined relative to a time $t_0$ corresponding to zero offset: a time range analysis is then determined located on either side of said time $t_0$ and of which the width is equal to at least the sum of the absolute values of said maximum values and at most to twice the absolute value of the maximum residual moveout, a family of 2n+1 residual correction hyperbolas or parabolas are constructed, each having its apex centred on said time $t_0$ and, at the value of the maximum offset, presenting a value of time that is equal to one of the 2n+1 equidistant time values predetermined on the analysis range, and including the value $t_0$ and the extreme values of said analysis range, 2n+1 sets of static corrections are determined for each of the offsets, defined by the time differences presented relatively to said time $t_0$ on the 2n+1 residual correction hyperbolas or parabolas, for each gather of traces, and successively to each of the traces and for each hyperbola or parabola, the static correction associated with the offset trace is applied, and the statically corrected traces are stacked together in order to obtain a set of 2n+1 stacked traces characterising a correction velocity field.

BRIEF DESCRIPTION OF THE DRAWINGS

The above and other features and advantages of the invention will appear on a reading of the embodiment of the method of the invention and the appended drawings wherein:

FIG. 6 represents a field of investigation in an analysis range, FIG. 7 schematically represents a BAP according to the invention, FIG. 8 schematically and empirically represents a succession of amplitude peaks selected on the BAP of FIG. 7 along the time axis, FIGS. 9 and 10 schematically represent respectively the results of a conventional velocity analysis and a velocity analysis according to the invention.

DETAILED DESCRIPTION OF EMBODIMENT OF THE INVENTION

Figure 1:
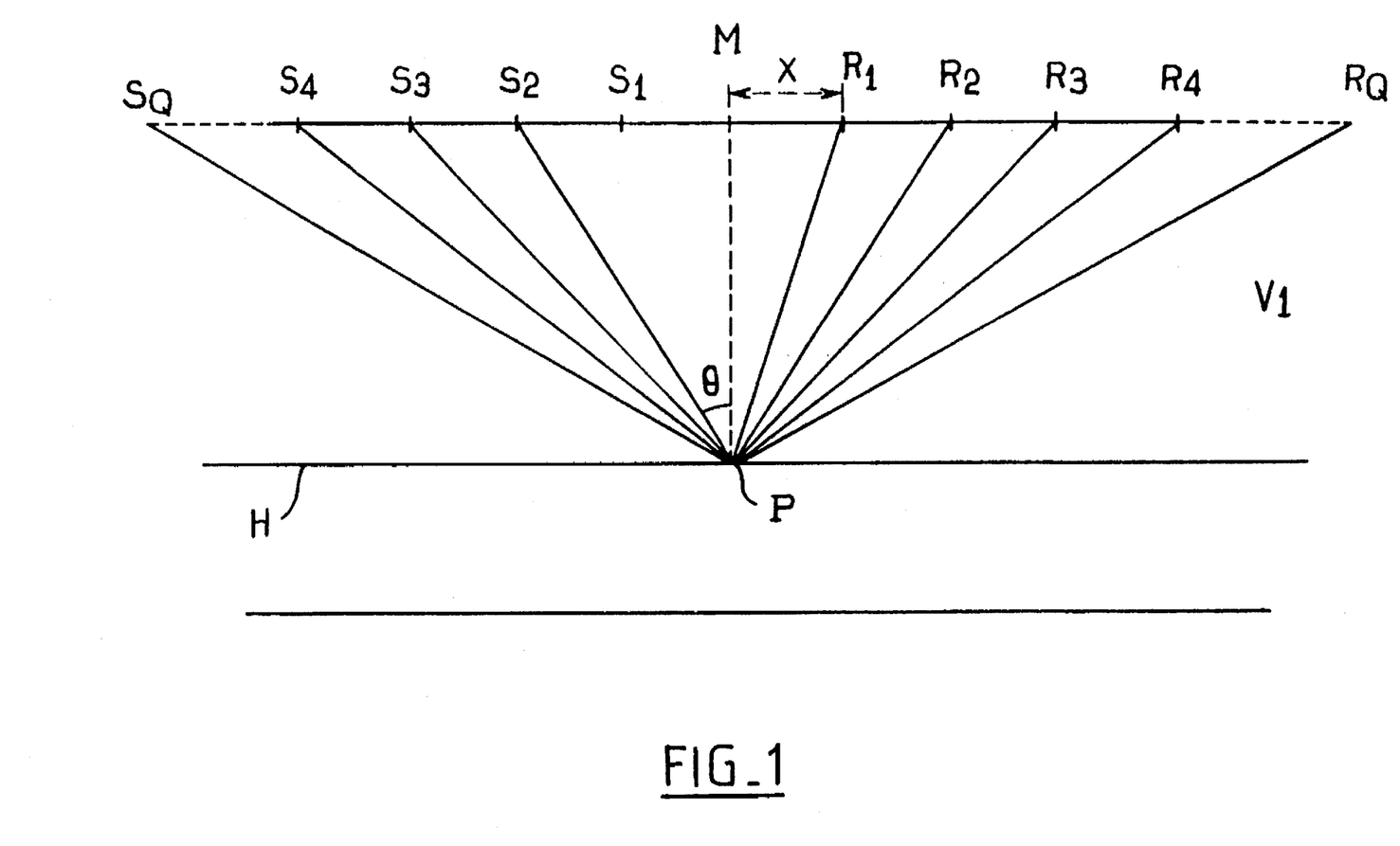
FIG. 1 is a schematic representation of an array of sources and receivers for the transmission and reception/recording of waves travelling in a first subsurface layer to be explored.
Figure 2:
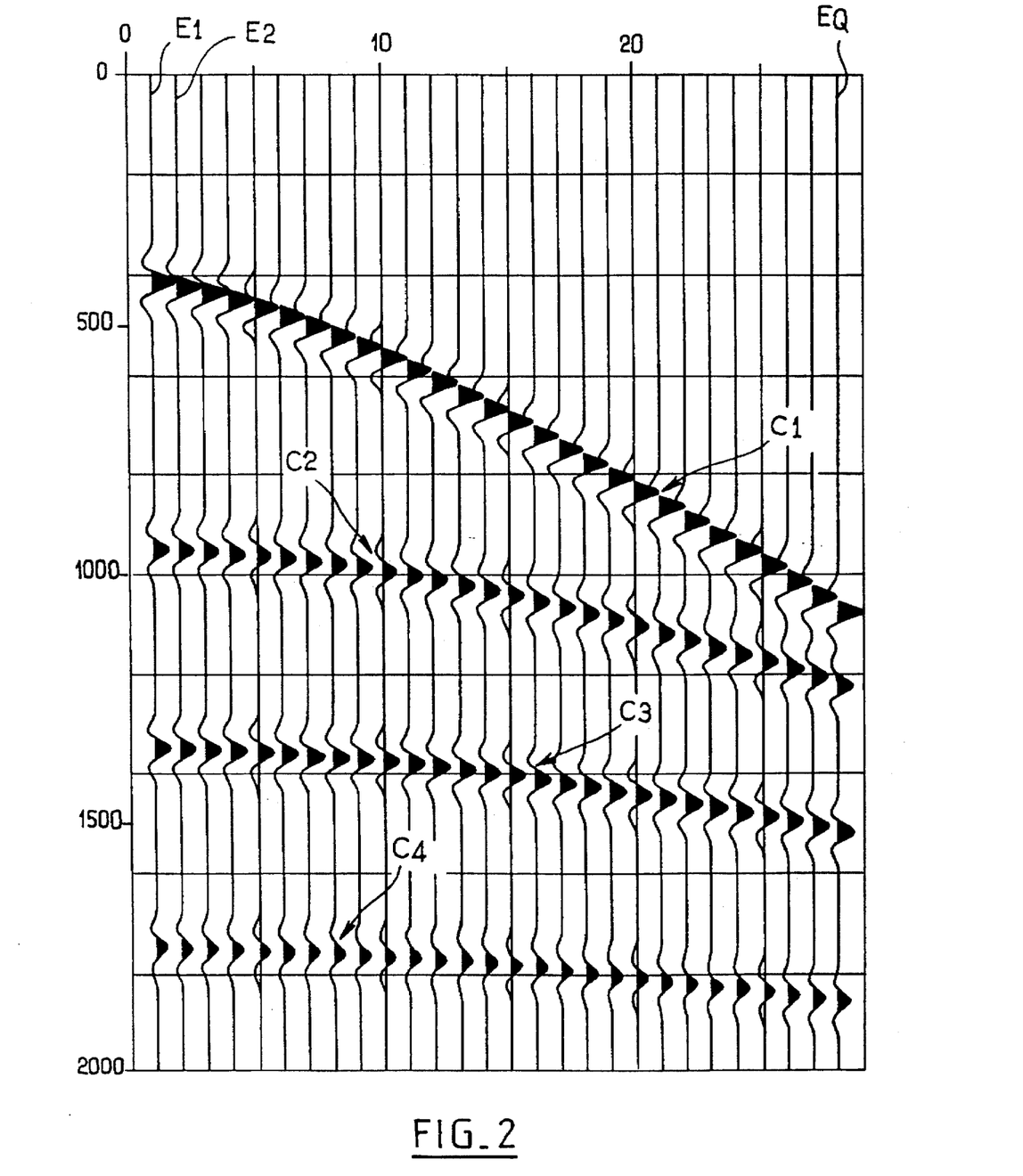
FIG. 2 is a schematic representation of a set of synthetic seismic traces as a function of the offset of the receivers.

In the device shown in FIG. 1, the source $S_1$/receiver $R_1$ pair is associated with seismic trace $E_1$ of FIG. 2 with minimum offset. The source $S_2$/receiver $R_2$ pair is associated with trace $E_2$ with higher offset, and so on until the source $S_Q$/receiver $R_Q$ pair associated with trace $E_Q$ obtained for maximum offset. The reflection events associated with each interface, such as H, of the geological model, are shown on each of the synthetic recordings of FIG. 2 by a juxtaposition of responses ordered along time/distance curves, of which only four, $C_1$ to $C_4$, are shown in FIG. 2. The time/distance curves $C_1$ to $C_4$ are portions of positive hyperbolas, of which the asymptotes are centered at the center of coordinates. In the case of FIG. 2, the equation of the time/distance curves characterising the travel time of the wave transmitted at a point S and received at a point R after reflection at the interface (or reflector) i is:

$$t_i^2(x) = t_{i0}^2 \frac{x^2}{V_s^2} \tag{3}$$

where:

x is the offset, $t_i$ and $t_{i0}$ are the wave arrival times respectively at the receiver with x offset and for zero offset (receiver and source placed at the same surface point), and $V_s$ (stack velocity) is the average apparent velocity in the medium traversed by the wave above reflector i. $V_s$ is expressed simply as a function of the average propagation velocities in each of the layers traversed by the wave, only in the case of plane and parallel layers.

The NMO corrections, which are applied before any stacking of the data contained on the gathers associated with the same vertical, consist in correcting recordings for the obliquity effects of the wave paths in the subsurface, such as path $S_2PR_2$ in FIG. 1, to bring them theoretically to vertical paths MPM. These corrections have the effect of bringing the time/distance curves theoretically to the horizontal, a position for which the track stacking of the corrected traces is optimal for the data on the time/distance curves.

Figure 3:
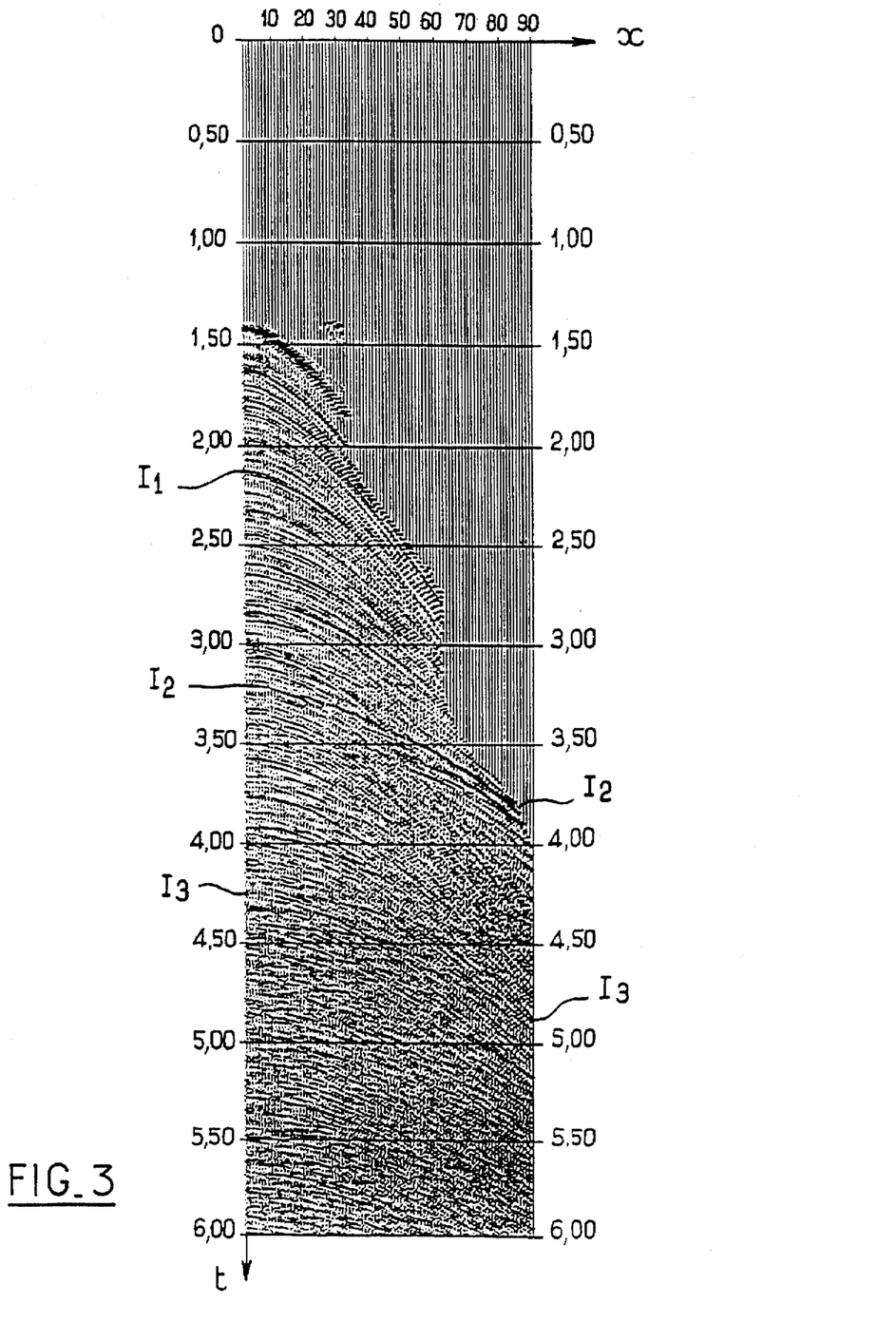
FIG. 3 represents a real gather of traces.

Since direct recognition of the moveout pattern is not easy on real gathers, like the one in FIG. 3, the following indirect method is used for this recognition:

an assumption is made as to the shape of the time/distance curves of the reflections, such as $I_1$, $I_2$ and $I_3$, among all the curves that comply with the assumption, the curves which optimise the stacking of NMO corrected traces are determined.

In conventional seismic prospecting, the only parameter that is varied in the propagation equation (3) is the value of the average apparent velocity $V_s$. A scanning of apparent velocities helps to define a family of curves which comply with the assumption of plane and parallel layers. The conventional method for velocity analysis can be used to select, from these curves, those that optimise the trace stack. The results of the conventional velocity analysis are obtained by the datum of some ten or more velocity/time pairs, the velocities $V_S$ being those which are associated with the curves optimising the trace stack, and the corresponding times $t_0$. The velocity values $V_S$ are then linearly interpolated in time in order to obtain a function $V_S(t)$ associated with the midpoint analysed. A linear interpolation in abscissa x is then made between the results of the different consecutive velocity analysis, obtaining as the final result a velocity field $V(x,t)$.

In the method of the invention, normal moveout corrections are first applied by using either the velocity $V_S$ obtained as previously described or a velocity $V'_S$ obtained by a velocity field $V'(x,t)$ known a priori. To do this, a time $t_0$ is assigned to the amplitude of each sample of each of the traces recorded with offset x, no longer its initial time t but said time $t_0$ which corresponds to it, defined by the equation:

$$t_0^2 = t^2 - \frac{x^2}{V_S^2} \qquad (4)$$

where $V_S$ is $V(x,t)$ or $V'(x,t)$.

If the calculated $t_0$ are not multiples of the sampling interval, an interpolation is made between the successive calculated values.

Obviously the value of the process described above depends on the initial assumption on the subsurface structure. The result of the application of conventional NMO corrections to the real example in FIG. 3 reveals, in FIG. 4, the existence of residual moveout, for example on the time/distance curves $\Gamma_2$ and $\Gamma_3$, which are larger as the real subsurface geometry deviates from the initial assumptions. In this case, the results of velocity analysis are wrong, and the conventionally built stack, made using the results of these analyses alone, is degraded.

The invention proposes in a second phase to reduce these residual moveouts, in order to determine a high resolution spatial, continuous and better resolved velocity field, as well as an improved stack.

It is first essential to define the equations which are used to calculate the residual corrections to be applied to the time/distance curves.

Figure 5:
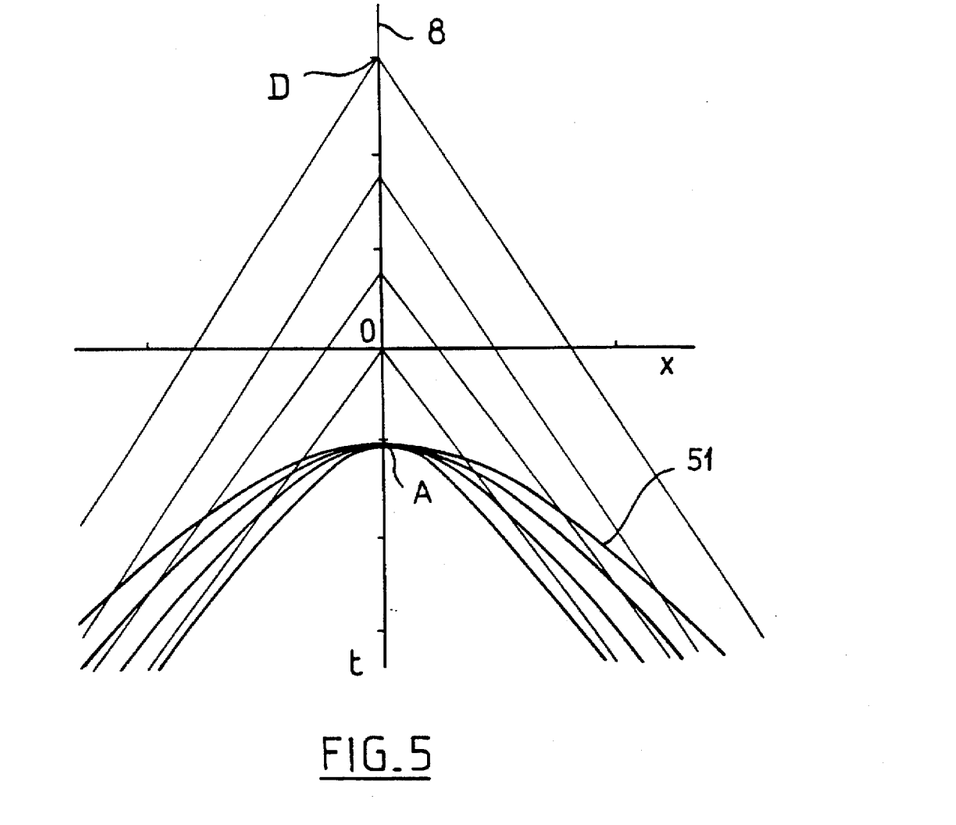

The optimal treatment consists in applying the so-called 'with delay' equation denoted P SCAN, based on the laws of geometric optics:

$$(t + t_r)^2 = (t_0 + t_r)^2 + \frac{x^2}{V_1^2} \qquad (5)$$

where:
- $t_0$ is the time separating the center of coordinates O from the apex A of the hyperbola,
- $t_r$ denotes the time separating the center of coordinates O from the center of symmetry of the time/distance curve (point D for hyperbola 51),
- $V_1$ is the average velocity or better, the lowest velocity of the first medium traversed and,
- x is the offset (FIG. 5).

This equation defines a family of hyperbolas that is better adapted than the family of hyperbolas defined by the conventional equation (1) to the geological media of any geometry presenting a cylindrical symmetry (or perpendicular to the profile axis).

For a given hyperbola moveout, the variation of the parameter $t_r$ results in a translation of the hyperbola along the time axis, and, in seismic prospecting, corresponds to the application of a static correction. By making the change of variable $t_p = t_0 + t_r$ (where $t_p$, by analogy with optics, can be treated as a focusing depth), the preceding equation becomes:

$$(t + t_p - t_0)^2 = t_p^2 + \frac{x^2}{V_1^2} \qquad (6)$$

as previously indicated in (2), where $1/t_p - t_0$ is the curvature of the time/distance curve The normal moveout correction is supplemented according to the invention, by a static correction which shifts by a time $\delta t$ all the samples making up each of the traces. This operation is very fast in a vector computer or one equipped with a matrix processor. This makes it possible to perform the operation, no longer as for the dynamic velocity analyses every m kilometers, but with manual velocity picking and a double interpolation, doing this automatically for all the samples of all the traces and for a wide range of hyperbola moveouts. This novel method does not require additional trace stretching in comparison with the NMO correction. Furthermore, it becomes possible to find velocity variations, positive as well as negative. Since all the events, such as real events, multiples, diffractions etc., are presented in the form of hyperbolas, they theoretically receive equal processing, provided they are deliberately sought. Multiples, which are manifested by moveouts that are quite different from those of the real surrounding reflectors, are eliminated by the processing according to the invention, contrary to what happens in the methods of the prior art, as long as the analysis range selected is sufficiently narrow.

To apply the second processing phase, it is first essential to define the height in time (milliseconds) of a analysis range, which will be used on all the recordings processed. The approximate height of the analysis range is empirically determined, for example by doubling the maximum residual moveout relative to the horizontal (corresponding to an infinite moveout) observable on the time/distance corrected gathers. At maximum offset $x_{max}$ in FIG. 4, for example, the maximum difference is observed for time/distance curve $\Gamma_3$ at maximum offset and has the approximate value $\Delta t=100$ ms. The height of this range is advantageously set at $2\Delta t$ or 200 ms.

Figure 4:
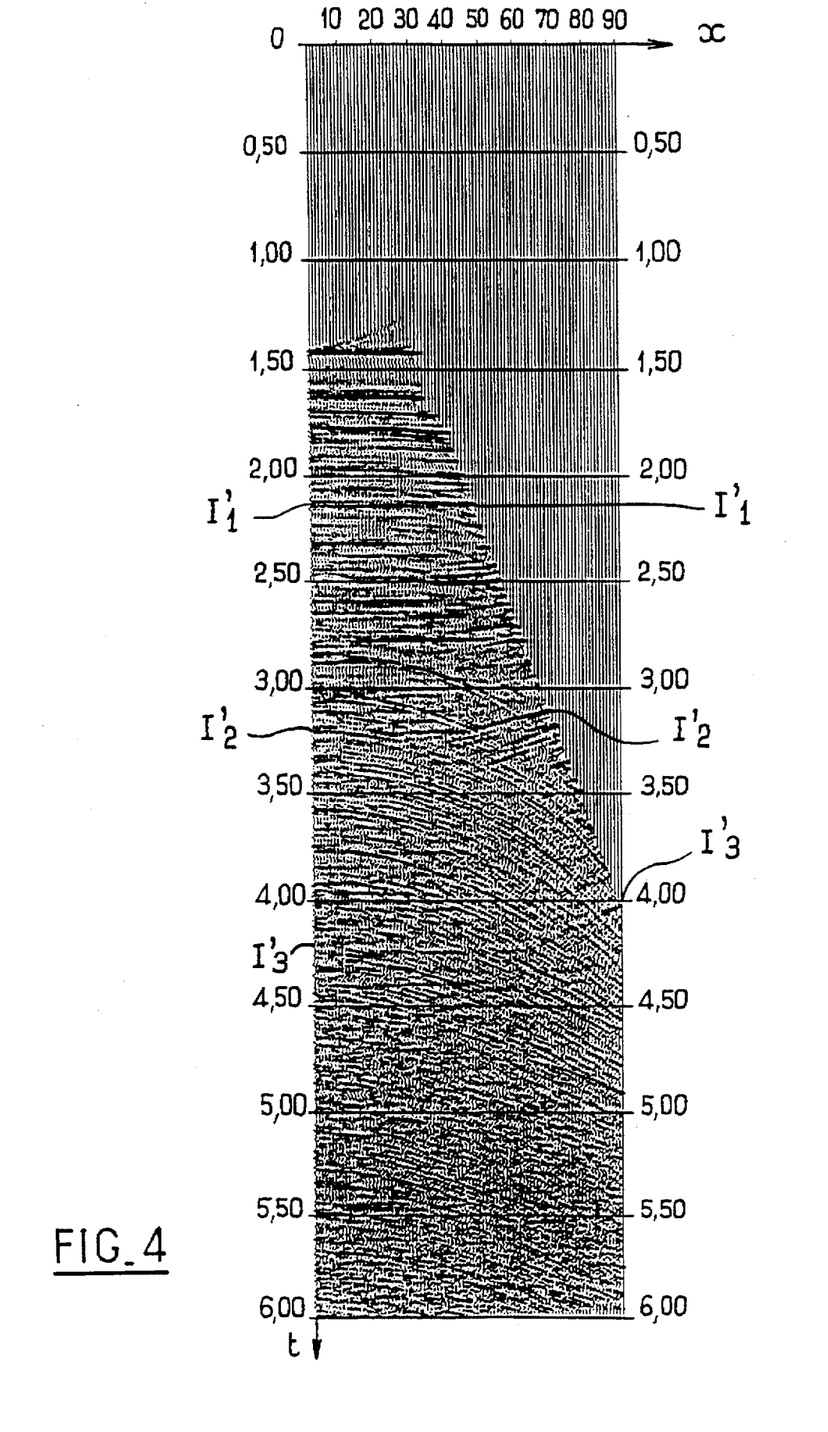
FIG. 4 represents the gather of traces of FIG. 3, after normal-moveout correction, FIG. 5 schematically represents a sample of a family of hyperbolas used for residual hyperbolicity correction.

In a following step, the number $2n+1$ of hyperbolas to be selected in the analysis range is determined, and, for offset $x_{max}$, the time interval separating the different hyperbolas analysed. For a correct data sampling, the signal theory defines a sufficient number $2n+1$ of hyperbolas covering the scan range $2\Delta t$. In practical terms, a sampling is made by taking:

$$2n = \frac{2\Delta t}{K/B} \qquad (7)$$

or:

$$n = \Delta t \frac{B}{K}$$

where K is a constant equal at most to $\sqrt{2}/2$ and B is the passband of the seismic event processed. The value of the ratio n is taken as an integer and from above. In FIG. 4, the value of B is 50 Hz, K is 0.5, and $2n+1$ is 21 for a analysis range of 200 ms.

The interval between hyperbolas for offset $x_{max}$ is determined by $p = \Delta t/n$. In the aforementioned example, p is 10 ms. The values of $t_p$ associated with 2n+1 hyperbolas serving for the static corrections and for the creation of a document called BAP, according to the invention, are given by the equation:

$$(t_p + \delta_{max})^2 = t_p^2 + \frac{x_{max}^2}{V_1^2} \qquad (8)$$

where $\delta_{max}$ successively assumes the 2n+1 multiple values of p covering the analysis range -np to +np, and x and $V_1$ are known from elsewhere.

Figure 6:
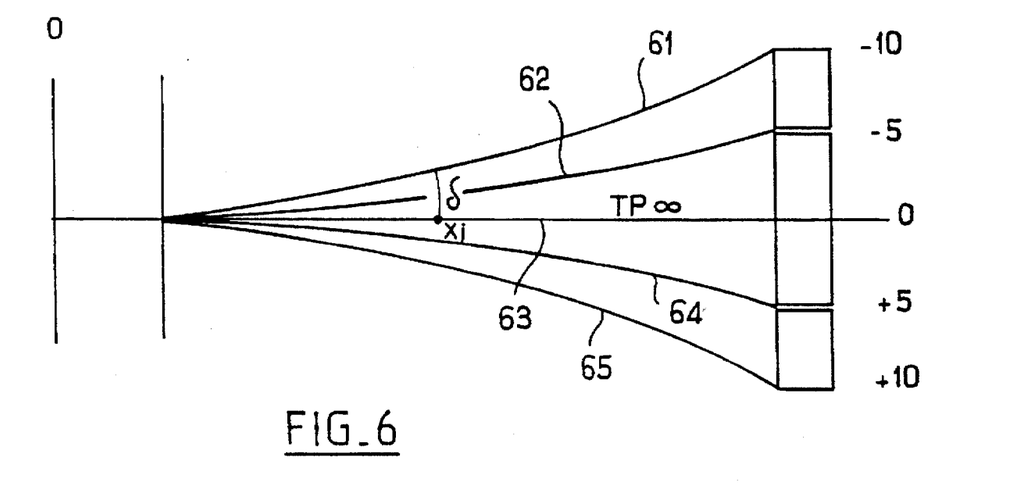

Such a set of hyperbolas appears in FIG. 6. Each of these hyperbolas 61 to 65, serving for the residual moveout correction to the previously NMO-corrected gather, is characterised by an index, called the ITP index, ranging from -n to +n, in connection with the deviation $\delta_{max}$ which characterises it at offset $x_{max}$ relative to the horizontal axis defined by the value $t_p = \infty$. By way of example, FIG. 6 shows hyperbolas 61 to 65 characterised respectively by the ITP indexes -10, -5, 0, +5 and +10, hyperbola 61 presenting a maximum negative deviation of -100 ms for offset $x_{max}$ and hyperbola 65 presenting a maximum positive deviation of +100 ms for the same offset $x_{max}$ relative to the value taken for zero offset. These maximum deviations constitute the bounds of the analysis range. Such a family of hyperbolas displays as characteristic the fact that their asymptotes are parallel to each other, as shown in FIG. 5, the apex A being the same.

In a following step, using the 2n+1 equations of the P SCAN hyperbolas determined in the previous step, the 2n+1 sets of static corrections which are applied to each of the traces of the gather are calculated. A set of static corrections for a hyperbola, which is characterised by its $t_p$, is composed of all the $\delta$ defined by the equation:

$$(t_p + \delta)^2 = t_p^2 + \frac{x^2}{V_1^2} \qquad (9)$$

where x assumes the different successive offset values characterising each of the traces. By way of example, FIG. 6 shows the value of $\delta$ for offset xj and hyperbola 61 with ITP index -10.

For each moveout characterised by its ITP index (or its corresponding $t_p$), and to the samples of each of the xi offset traces, the associated static correction $\delta(xi)$ is applied, defined by equation (9) for the $t_p$ considered.

This gives a statistically corrected gather, which is stacked to obtain a primary stacked trace characterised by its ITP index or the value of its $t_p$.

This operation is carried out for each ITP, thus giving a new gather of stacked traces ordered according to the increasing values of the ITP. This gather is called BAP or BAP DELTASTACK. A BAP DELTASTACK is shown schematically by way of example in FIG. 7. This BAP comprises the 21 primary stacked traces with ITP index 0, and +1 to +10, and -1 to -10. Such a BAP is built for each of the corrected gathers after they have been statically corrected as indicated above using the 2n+1 sets of static corrections calculated for all the data processed. Amplitude peaks can be observed on the primary stacked traces of each of the BAP. For example, primary stacked trace 70 with ITP index -3, in FIG. 7, displays three significant peaks 71 to 73 located approximately at 400, 1350 and 1750 ms respectively.

Figure 7:
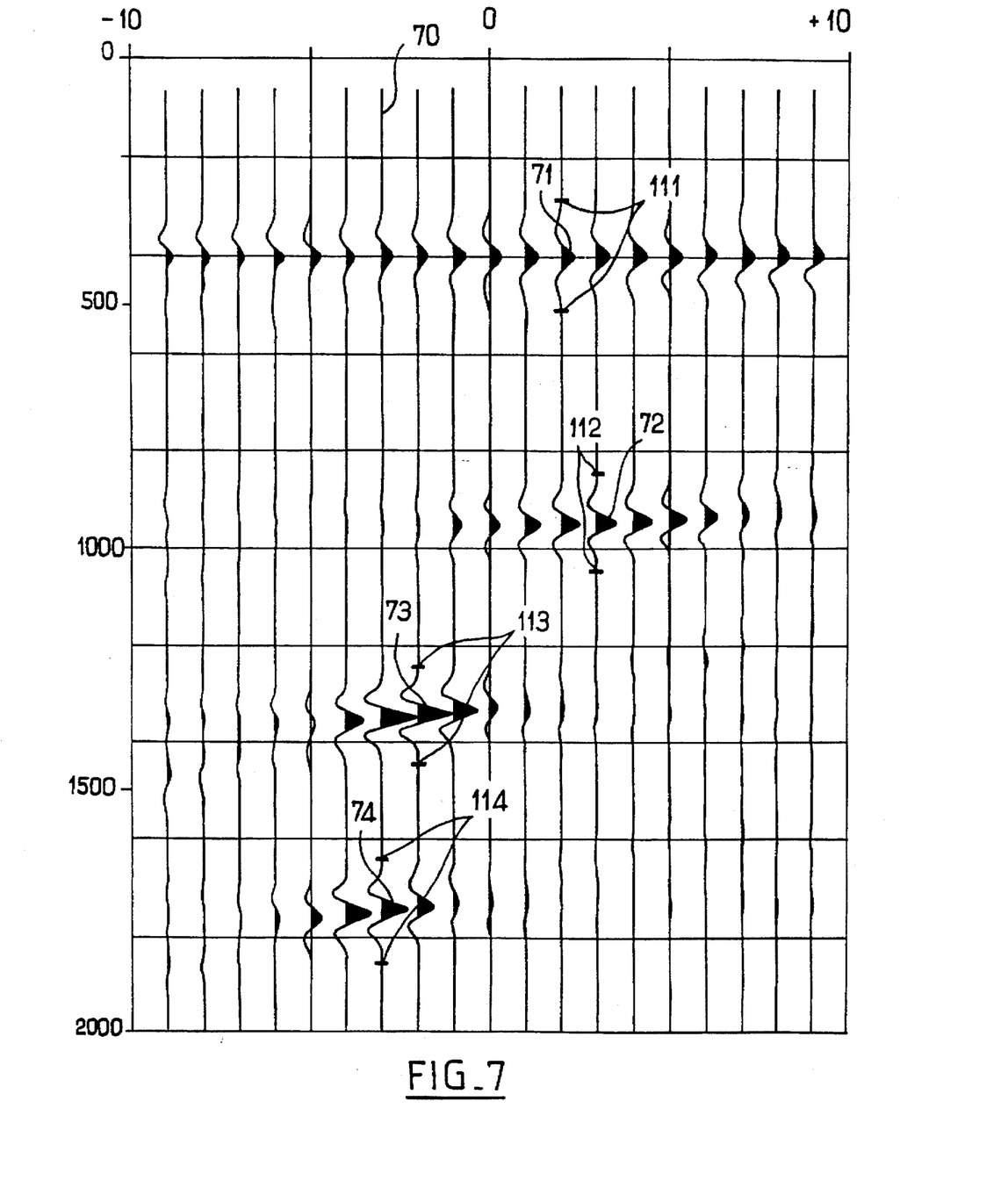

The next step of the method of the invention consists in picking the significant amplitude peaks on the BAP. One way to do this consists, for example, in first constructing the amplitude envelope for each primary stacked trace of the BAP. The BAP can then be considered as a grid of amplitude values indexed in time and ITP indexes, and a 2D operator can be applied to find the energy peak. The energy peaks on the BAP can be found by working with one dimension, building a representative trace of the maximum energy as a function of time, constructed by retaining, for each time, the maximum of the 2n+1 amplitude values on the 2n+1 traces of the BAP and the time concerned. The ITP index of the stacked trace of the BAP having the maximum value is stored in computer memory. Such a trace is shown schematically as a function of time in FIG. 8.

Figure 8:
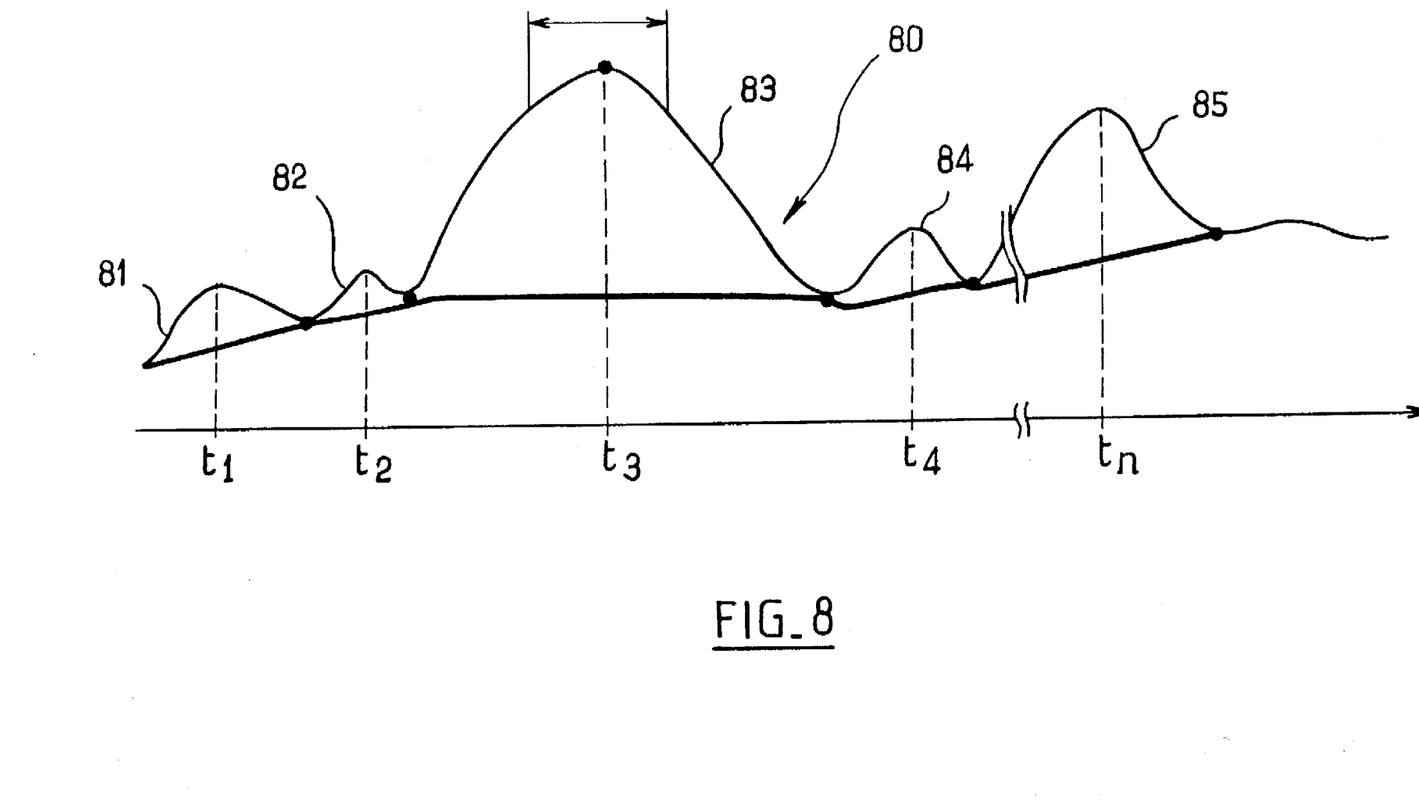

This trace 80 displays peaks 81 to 85 which are picked using a window that is slid along the time axis. Only the peaks which can be centered on said window, such as peaks 81, 83 and 85 on trace 80, are selected.

Regardless of the picking mode selected, in the preferred embodiment described, the matter is handled so that two peaks are not selected for the same time on the BAP.

In the case of picking using a 2D operator, the previous condition is satisfied if the width of the operator is equal to the width of the BAP. In this type of unidimensional picking (FIG. 8), this condition is satisfied automatically because only one peak is selected per time. Advantageously, the width of the window or the height of the 2D operator is equal to 2/B.

The determination of the peaks of the BAP and of the parameters (time and $t_p$) associated with these peaks is the first result of the method of the invention. These parameters permit the determination of a high resolution stacking velocity field at any midpoint, as well as the building of a stacked trace which reconstructs the reflected events better than a conventional stack section which only uses the NMO correction phase of the common midpoint gathers.

It is shown that, as a first approximation, the total correction velocity $V_f$ can be calculated from the following formula:

$$V_f = V_S - V_S^3 * \frac{t_0}{2 \cdot V_1^2 \cdot t_p} \qquad (10)$$

where:

$V_S$ is the initial NMO correction velocity, $V_1$ is the wave velocity in the first layer of the medium explored, $t_0$ is the zero offset time, $t_p$ is the focusing depth time.

Since all the parameters in equation (10) are known, it is possible to calculate the value $V_f$ for each of said peaks selected on each of the BAP, from the corresponding $t_p$. Each value $V_f$ is associated with the time $t_0$ which corresponds to it. The number L of ($V_f$, $t_0$) pairs varies from one BAP to another. The total ($V_f$, $t_0$) pairs serve to determine a new velocity distribution for each midpoint.

In general, the method of the invention can be used to obtain, for each midpoint, a number of values 1 of velocities $V_f$ that is larger than the number of values obtained by conventional velocity analysis, commonly ranging between 8 and 20.

Figure 9:
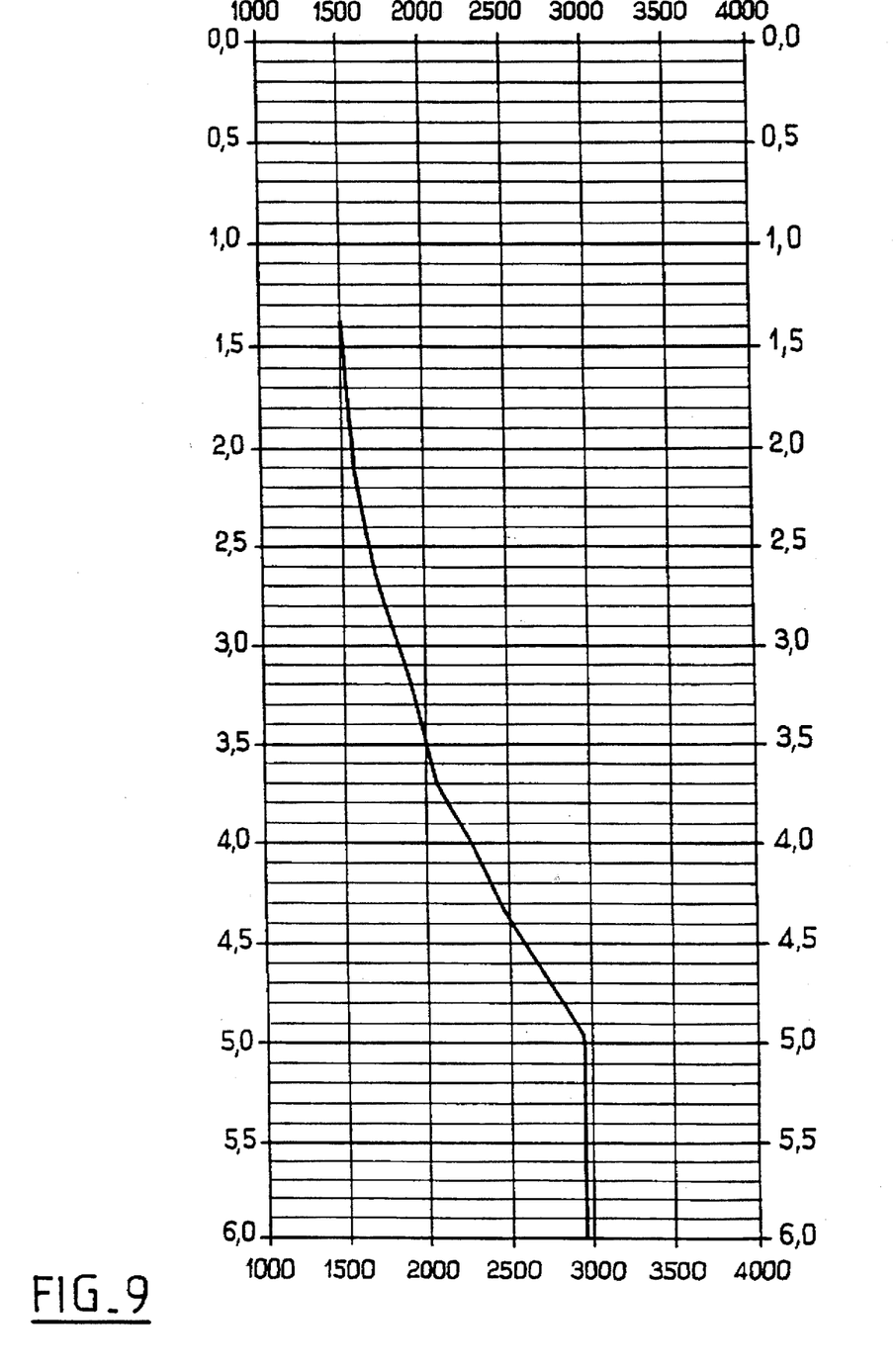
Figure 10:
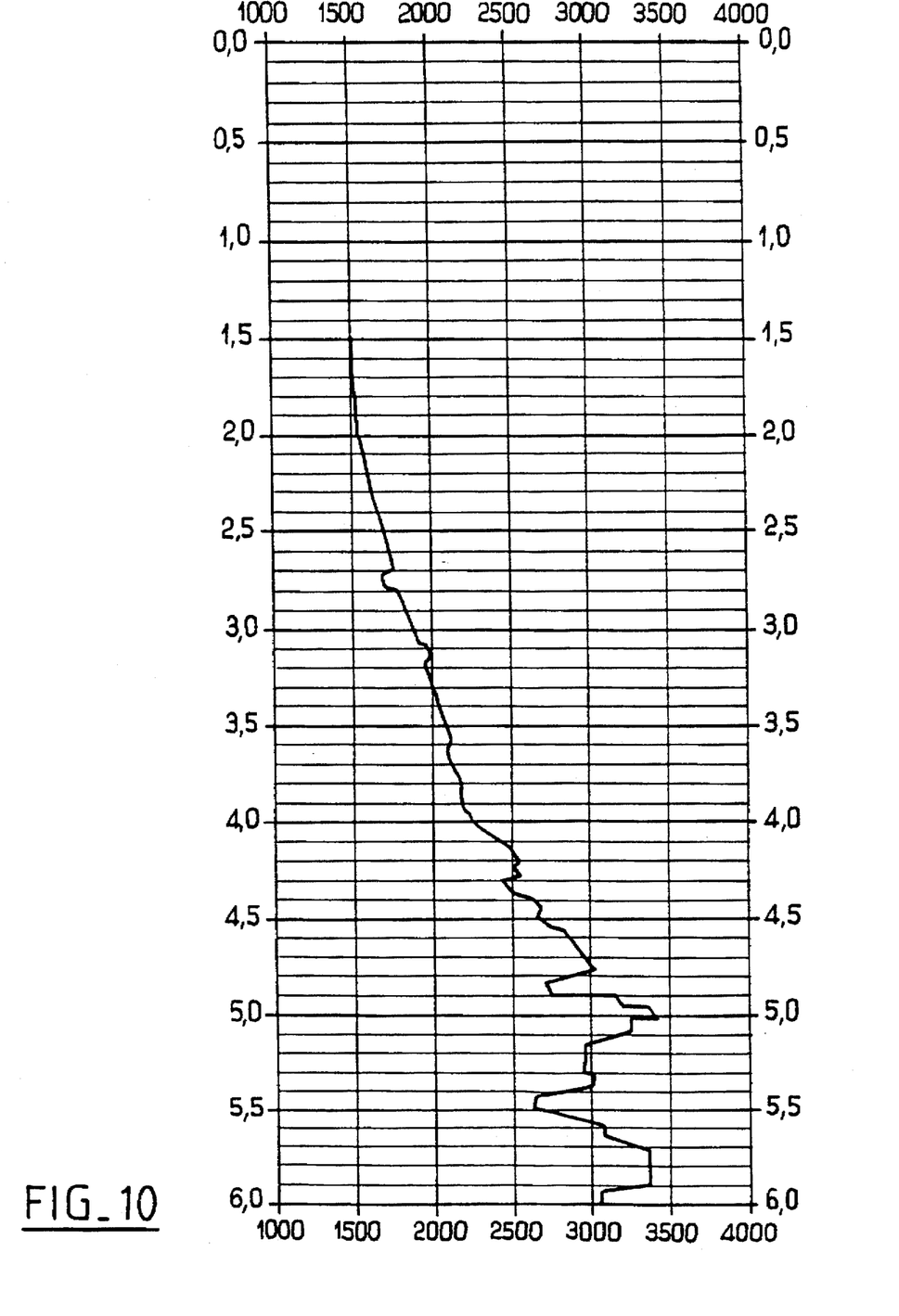

By way of illustration, in FIGS. 9 and 10, a comparison is made of the results of a conventional velocity analysis (FIG. 9) and a velocity analysis according to the invention (FIG. 10), both obtained from the gather in FIG. 3.

To obtain a high resolution velocity field V", the knowledge of the velocity distribution $V_f$ for each midpoint helps to reduce the velocity field calculation to a simple interpolation in time.

Figure 11:
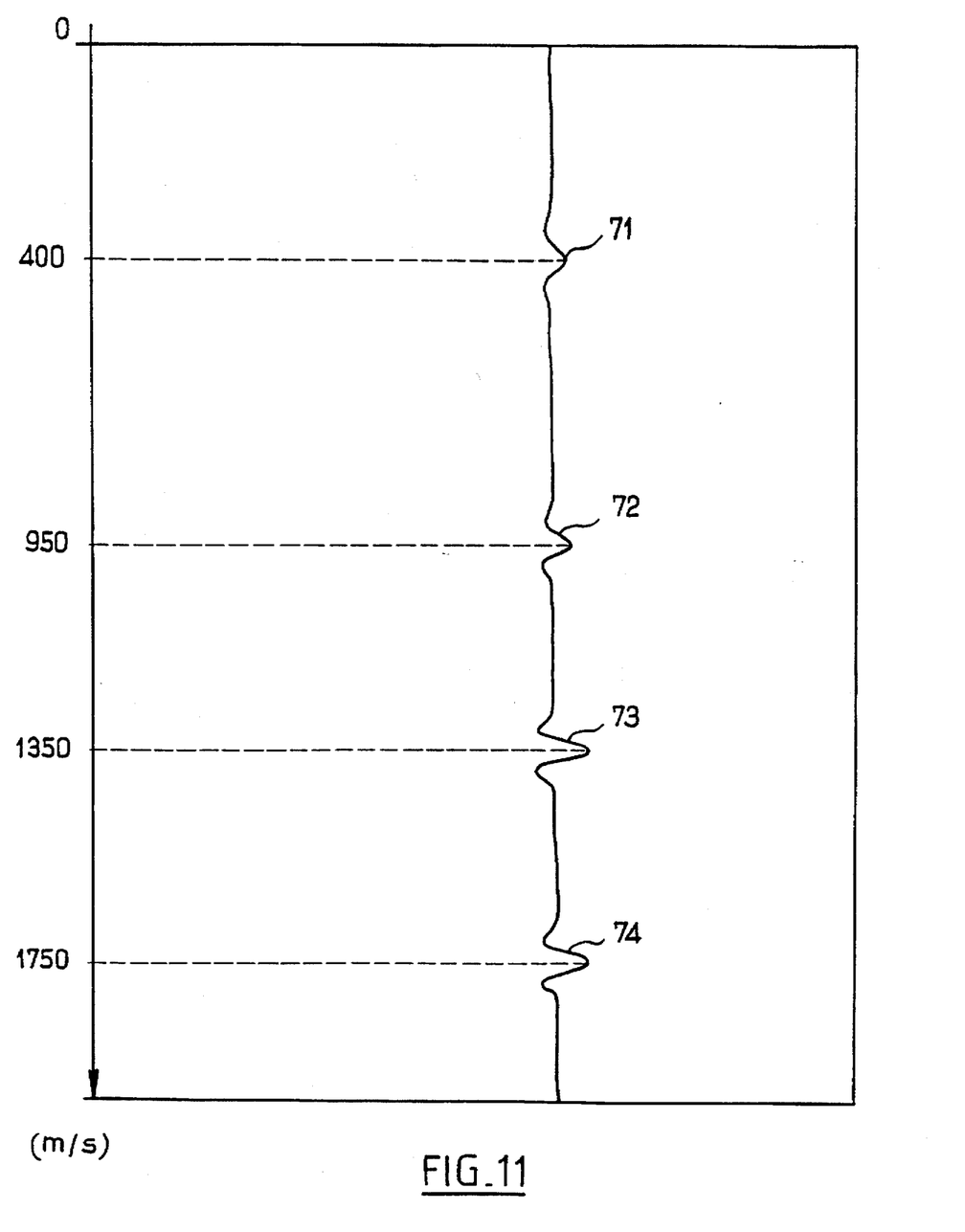
FIG. 11 is a schematic representation of a composite stacked trace obtained from the BAP of FIG. 7.

The result of the picking of peaks 71 to 74 on the BAP in FIG. 7 also helps to build a time section of which each of the traces, for each midpoint of the profile processed, is prepared as follows: the portions 111 to 114 are selected of the primary stacked traces 70 centered on the peaks 71 to 74, of predetermined time (shown in FIG. 7 by small horizontal dashes), less than or equal to the height in time of the sliding window used to pick the peaks in FIG. 8. A composite trace 110 is generated (FIG. 11), associated with the midpoint by joining the times of portions 111 to 114 thus selected on the same axis, by preserving the position of these portions in time, and by connecting them by linear portions of the BAP space.

Alternatively, a portion of the processing consists in successively applying to each trace of each NMO-corrected gather, 2n+1 sets of static corrections defined, for the offset corresponding to the trace, by the time deviations presented relatively to $t_0$ on the 2n+1 static correction hyperbolas. The corrected traces associated with each midpoint are then grouped into 2n+1 groups, each consisting of the traces which have undergone the static corrections corresponding to one of the correction hyperbolas, and in stacking the corrected traces of each group to obtain a set of 2n+1 primary stacked traces corresponding to the 2n+1 static correction hyperbolas, said set constituting the set of seismic traces characterising the fine NMO correction velocity field for the midpoint considered.

In the foregoing discussion, reference has been made to families of correction hyperbolas answering to formula (2). However, it is possible to use families of parabolas instead of said families of hyperbolas. The resolution of the equation defined by formula (2) leads to the following formula:

$$t - t_0 = \frac{x^2}{t_p V_1^2} * \frac{1}{1 + \sqrt{1 + (x^2)/(t_p^2 V_1^2)}} \quad (2')$$

A series development of formula (2') leads to a new formula (2") of the type:

$$t - t_0 = \frac{x^2}{2V_1^2 t_p} - \frac{1}{8} * \frac{x^4}{V_1^4 t_p} + \ldots \quad (2'')$$

If x is small relative to $V_1$, the $x^4$ and higher order terms can be ignored. In this case, formula (2") is reduced to:

$$t - t_0 = \frac{1}{2} * \frac{x^2}{2V_1^2 t_p} \quad (2''')$$

which is the equation of a parabola.

The steps of the method of the invention can be carried out with the family of parabolas defined by formula (2'''). Thus, in FIG. 6, hyperbolas 61 to 65 can therefore be replaced by the corresponding residual moveout correction parabolas on the NMO-corrected gather, and then by proceeding as indicated in the description of the preferred embodiment of the invention.

We claim:

1. A method of processing variable-offset seismic reflection traces to obtain a set of traces that can be used for the determination of at least one of a high resolution spatial velocity field and composite seismic traces, wherein the method comprises the steps of:

(a) obtaining normal moveout (NMO) corrected seismic traces of common midpoint gathers;

(b) subjecting the traces to a dynamic obliquity correction comprising the steps of:

(c) determining the maximum values of the positive and negative residues of the NMO corrected gathers relative to a time $t_o$ corresponding to zero offset;

(d) determining an analysis range, the time-width of which is between the sum of the absolute values of the maximum values of the positive and negative residues and twice the absolute value of the maximum residual moveout;

(e) constructing a family of 2n+1 residual correction curves, taken from the group consisting of hyperbolas and parabolas, having their apexes centered at the time $t_o$;

(f) determining a time interval between the 2n+1 equidistant residual correction curves using the maximum offset and the analysis range;

(g) determining 2n+1 sets of static corrections for each of the offsets using the time interval relative to the time $t_o$ and the 2n+1 residual correction curves;

(h) applying the 2n+1 sets of static corrections to each trace of the gather in succession and in accordance with the appropriate offset; and (i) stacking the statically corrected traces and obtaining a set of 2n+1 stacked traces representing a correction velocity field.

2. The method of claim 1, wherein the step of obtaining the normal moveout corrected traces of the common midpoint gathers comprises using conventional velocity analysis at a plurality of predetermined midpoints.

3. The method of claim 1, wherein the step of obtaining the normal moveout corrected traces of the common midpoint gathers comprises using a known velocity field.

4. The method of claim 1, wherein the steps of constructing the family of 2n+1 residual correction curves and determining the time interval comprises the step of separating the curves at the predetermined value of the maximum offset, wherein n is the nearest integer of the ratio of one-half of the analysis range ($\Delta t$) and K/B, and wherein K is a coefficient at most equal to $(2)^{1/2}/2$ and B is the passband of the common midpoint recordings.

5. The method of claim 1, wherein the family of static correction hyperbolas are defined by the equation:

$$(t - t_0 + t_p) = t_p^2 + \frac{x^2}{V_1^2}$$

wherein x is the offset, t and $t_o$ denote the source/receiver travel times for offset x and for zero offset respectively, $(t-t_o)$ is the value of the static correction as function of the offset x, $t_p$ is the sum of the time $t_o$ and the time separating the origin of the coordinates from the center of the hyperbola, and $V_1$ denotes the propagation velocity of the waves transmitted in the first subsurface layer explored.

6. The method of claim 1, wherein, for low values of x relative to $V_1$, the family of static correction parabolas is defined by the general equation:

$$(t-t_o) = (\tfrac{1}{2})px^2$$

wherein x is the offset, t and $t_o$ are the source/receiver reflection travel times for offset x and for zero offset respectively, $(t-t_o)$ is the value of the static correction as function of the offset x, $p=1/(t_p V_1^2)$, $t_p$ is the sum of the time $t_o$ and the time separating the origin of the coordinates from the center of the parabola, and $V_1$ is the propagation velocity of the waves transmitted in the first subsurface layer explored.

7. The method of claim 1, further comprising the steps of:

(j) selecting the peaks on each of the sets of the 2n+1 stacked traces using a sliding window with a predetermined time height, the time height being equal to about 2/B, and selecting only the centered peaks in the window;

(k) associating each peak with a value of $t_o$ and $t_p$; and (l) calculating the velocity $V_f$ corresponding to the time pair $(t_o, t_p)$ using the equation:

$$V_f = V_S - V_S^3 * \frac{t_0}{2V_1^2 t_p}$$

where $V_s$ is the velocity used in the normal moveout correction.

8. The method of claim 1, further comprising the steps of:

(j) selecting the peaks on each of the sets of the 2n+1 stacked traces using a sliding window with a predetermined time height, the time height being equal to about 2/B, and selecting only the centered peaks in the window;

(k) selecting portions of the stacked traces centered on the peaks which are of predetermined time-length, the time length being equal to about the time-length of the sliding window;

(l) generating a composite stacked trace associated with the midpoint corresponding to the set of the 2n+1 stacked traces by placing the portions of the 2n+1 stacked traces on the same time axis; and (m) fixing the position of the portions on the time axis.

* * * * *